A. M. Smith,
Carpet Fastener.
N° 24,242. Patented May 31, 1859.

Witnesses
E. P. Reed
E. H. Smithson

Inventor
Albert M. Smith

UNITED STATES PATENT OFFICE.

ALBERT M. SMITH, OF NEW YORK, N. Y.

CARPET-FASTENER.

Specification of Letters Patent No. 24,242, dated May 31, 1859.

*To all whom it may concern:*

Be it known that I, ALBERT M. SMITH, of the city of New York, State of New York, have invented a new and useful Improvement on Carpet-Fasteners; and I do hereby declare that the following is a full and exact and clear description of the construction and operation of the same, reference being had to the annexed drawings, making a part of this specification, in which—

Figure 1:
Figure 2:
Figure 3:
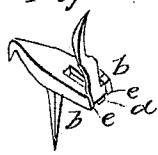
Figure 4:
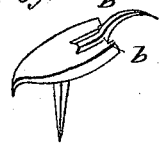

Figures 1 and 2 are sectional views. Figs. 3 and 4 are descriptive views, and Fig. 5 a perspective view.

The nature of my invention consists in constructing a hook or hook part and an eye, or piece, with catches or lips, to be used in a reversed manner to fasten down carpets, causing the carpet when attached to the hooks or points of the hook part, to draw back toward or against its head instead of its point or points thereby and at the same time drawing it back on or under the eye, or catch piece to be fastened to the floor so as to hold the carpet down securely to its place.

To enable others skilled in the art to make and use my invention I will proceed to describe its construction and operation.

I make the eye or piece to be fastened to the floor, with a point to it to drive into the floor, a slot or opening and bearing for the hook part to slide or draw back in, and a hole or place for it to turn in, and projections or lips at the sides at right angles with the hook or in front parallel with it, so that the hook part can be fastened to it and held down to the floor, by the projections or lips on its sides, or the hook itself drawing or sliding under or on them so as to produce the desired effect as at Fig. 1, with a point as at "$a$," to drive into the floor, projections or lips at the sides as at "$b\ b$" for the hook part to slide under, to hold it down, a slot or opening as at "$c$" for the hook part to slide back in, a bearing as at "$d$" for it to slide back on, lips turned in as at "$e\ e$" for the bearing of the hook part to strike against to keep it from coming out and from turning too far over back and a point or points as at "$f$" to catch into the floor to keep it from twisting around.

I make the hook or hook part to fasten into the carpet, with a hook point or teeth one or more, the bearing at its head round, flat, or square, projections or lips at its sides to slide into the eye, or with a slot or hole through it, so as to slide over it or in any way that shall produce the desired effect, as at Fig. 2 with a hook as at "$g$" projections or lips at its sides as at "$h\ h$," to slide under the lips on the eye to hold it down to the floor, bearings as at, "$i\ i$" long and wide enough so that it will turn in the eye and not come out of it, and keep its upright position when turned up, as at Fig. 3.

Figure 5:
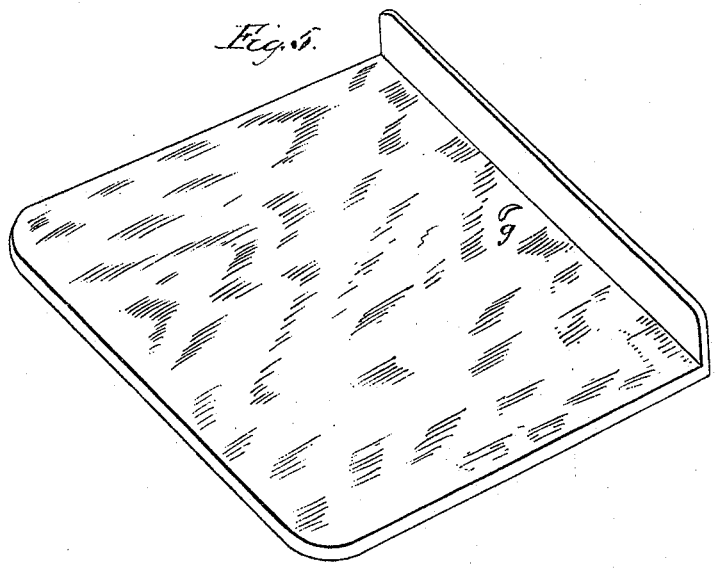

To apply it, the eye with the hook part attached to it, as at Fig. 4, is driven into the floor, then the hook is turned up as at Fig. 3, the lips on each side of the hook part "$h\ h$," Fig. 2 resting on the lips of the eye, as at "$b\ b$" Fig. 3, and the lower part of the bearing "$i\ i$" Fig. 2 resting or pressing against the lips on the end of the eye as at "$e\ e$" Fig. 3, the carpet is laid onto the point of the hook, and pressed down till the hook is pricked through it, then it is turned over, the point toward the outside or base of the room, then by the strain of the carpet "or otherwise" it is slid back on the bearing at the lower part of the slot in the eye as at "$d$," and under the lips as at "$b\ b$" Fig. 4, so that it holds the carpet securely to the floor as at "$g$," Fig. 5.

I do not claim the hook or hooks, and eye, so constructed as to be used in a reversed manner, "the hook or hooks turning toward the outside or base of the room," but What I do claim is—

The combination and arrangement of the point "$a$," lips "$b\ b$," slot "$c$," bearing "$d$," lips "$e\ e$," point "$f$," hook "$g$," lips "$h\ h$," bearings "$i\ i$," substantially as and for the purpose herein specified.

ALBERT M. SMITH.

Witnesses:
E. P. BREED,
E. H. SMITHSON.